June 28, 1960 D. E. SUNSTEIN 2,943,151

SIGNAL DROP-OUT SYSTEM

Filed Nov. 26, 1954 2 Sheets-Sheet 1

INVENTOR.
DAVID E. SUNSTEIN
BY
Brown, Denk & Seynnestvedt
AGENTS

June 28, 1960 D. E. SUNSTEIN 2,943,151

SIGNAL DROP-OUT SYSTEM

Filed Nov. 26, 1954 2 Sheets-Sheet 2

INVENTOR.
DAVID E. SUNSTEIN

BY

Brown, Denk & Synnestvedt

AGENTS

United States Patent Office 2,943,151

Patented June 28, 1960

2,943,151

SIGNAL DROP-OUT SYSTEM

David E. Sunstein, Bala-Cynwyd, Pa., assignor to Philco Corporation, Philadelphia, Pa., a corporation of Pennsylvania Filed Nov. 26, 1954, Ser. No. 471,134

9 Claims. (Cl. 179—15)

This invention relates to timing circuits and more particularly to means for and the method of dropping out a signal in multichannel time division multiplex systems.

A time division multiplex system is a system which accepts a number of message signals and combines these signals into a single composite signal which can be transmitted to a distant point over a single channel. The single channel may be a microwave relay link, a coaxial cable or other similar transmission means. In an amplitude modulated time multiplex system the message signals are broken up into a series of pulses, with the amplitude of each pulse being made proportional to the instantaneous amplitude of the message signal at the time the pulse is derived. These pulses may be bipolar; that is, they may vary in a positive or negative direction from the reference axis of the composite signal depending upon the polarity of the message signal. In a typical system for handling 24 message signals, the pulses derived from each message signal may have a duration of 2 $\mu$-seconds and recur at a rate of 8,000 pulses per second. The pulses representing the individual message signals are combined in sequence to form the composite signal. Again in a typical system the spacing between the adjacent pulses may be of the order of 5 $\mu$-seconds. For reasons that will appear presently it is desirable to select adjacent channel spacing with reference to the time to the first or second null in the characteristic transient of the system. A synchronizing signal is normally combined with the composite signal to identify the location of the first message channel in the composite signal.

At the receiving station it is necessary to separate the composite signal into the individual message signals. If there are many receivers for a single transmitter it may be that a particular receiver is interested in only one message signal or only one signal at a time. Circuits for separating one or more signals from the composite signals are known in the art as "dropout circuits."

The problem of separating the desired message signals from the composite signal at the receiver is complicated by the fact that the original pulse signals must pass through many circuits of limited bandwidth in the transmitter and receiver. This causes each of the pulses to appear as a transient having a period determined by the effective upper cut-off frequency of the circuits through which it passes. In order to separate at the receiver the message signals in one channel from signals in adjacent channels it is necessary to sample the composite signal at such a time that all transients except the desired transient have an amplitude equal to zero. If the signal at the receiver is sampled at any other time, objectional interchannel crosstalk will appear in the output signal. The presence of the transients in the composite signal reduces the permissible variation in the time position of the sampling pulse at the receiver to a small fraction of the original five microsecond spacing. In a typical time multiplex system the permissible variation in the time position of the sampling pulse may be of the order of one-half microsecond or less. The proper timing of the sampling pulse at the receiver is further complicated by the fact that the receiver and transmitter are usually located at widely separated points so that conditions affecting the timing of the transmitter do not similarly affect the timing of the receiver. In the past these problems have been solved either by providing a very wide time spacing between adjacent pulses representing different message signals, which is wasteful of space in the frequency spectrum, or by employing very complex timing circuits for controlling the time of occurrence of the sampling signal at the receiver.

It is an object of the present invention to provide a simple economical drop-out circuit for time division multiplex systems.

It is a further object of the invention to provide a drop-out circuit for time division multiplex systems which is relatively insensitive to variations in the timing of the received signal.

Still another object of the invention is to provide a self-correcting drop-out system which provides an output signal with a minimum of adjacent channel crosstalk.

A further object of the invention is to provide a simple, fully adjustable drop-out circuit which will accurately drop out any one of the channels of a multichannel system.

In general, these and other objects of the invention are realized in a system which drops out two adjacent channels of a composite time multiplex signal, measures the cross-correlation between the output signals of the two channels and automatically positions the sampling pulse signals in accordance with the magnitude and polarity of the cross-correlation signal.

For a better understanding of the present invention reference should now be made to the following detailed description which is to be read in conjunction with the accompanying drawings in which.

Figures 1, 2A, 2B, 4:
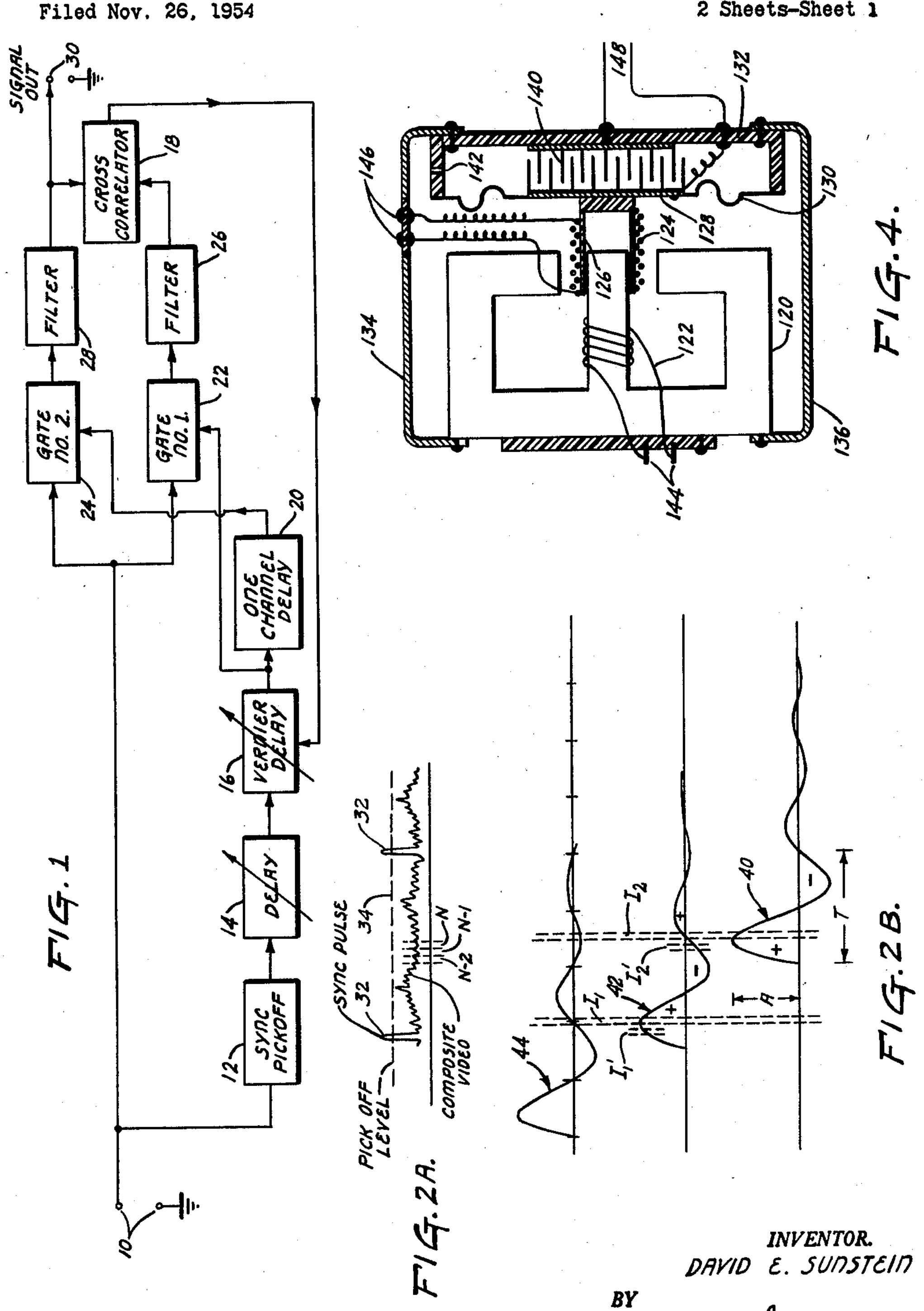
Fig. 1 is a block diagram of one preferred embodiment of the invention.
Figs. 2A and 2B are waveforms illustrating the operation of the system of Fig. 1.
Fig. 4 is a sectional view of one form of cross-correlating element of the type employed in the circuit of Fig. 3.

In describing the systems of Fig. 1 it will be assumed that these circuits are being supplied with time multiplex signals in the usual form from a suitable transmitter of such signals, via a receiver capable of reproducing composite transmitted signals with a certain degree of fidelity. As mentioned earlier, the time multiplex signal will normally comprise a complex signal made up of sequentially arranged samples of the various message signals to be transmitted and a series of superimposed synchronizing signals.

In Fig. 1 the time multiplexed signal, including the synchronizing pulses is supplied to terminals 10 of the drop-out circuit from a conventional radio receiver or other receiving equipment. The receiving equipment is not shown in Fig. 1 but it may consist of the usual mixer, IF amplifier and second detector if the signal is received over a microwave radio link, or it may consist only of video amplifiers if the signal is received over a relatively short coaxial line. The signal at terminals 10 is supplied to circuit 12 whichs acts to separate the synchronizing pulses from the composite video signal. In the usual pulse amplitude modulation type of time division multiplex systems the synchronizing pulse is caused to have an amplitude somewhat greater than that of the highest peaks in the composite video signal. These high amplitude synchronizing pulses are separated from the composite video signals by passing the signal, including the synchronizing pulses, through an amplifier biased well below cut-off. The high amplitude synchronizing pulses drive the grid of the amplifier above cut-off and produce an output pulse in the anode circuit. The composite video signals do not have sufficient amplitude to drive the grid above cut-off so they produce no response in the anode circuit of the amplifier. Sync pick off circuit 12 may be a biased amplifier of this type.

The synchronizing pulses in the output of circuit 12 are supplied to an adjustable delay means 14. This delay means may be a lumped constant delay line or it may be a multivibrator or phantastron type delay circuit. The selection of the channel to be dropped out is made by selecting the appropriate delay for delay means 14. If the Nth channel is to be dropped out, where N may be any integer between 2 and the total number of channels present in the time multiplexed signal, delay means 14 provides a delay approximately equal to the length of the time interval from the synchronizing pulse to the proper time for sampling channel N–1, that is, the channel just preceding the Nth channel. The pulse signals in the output of delay means 14 are further delayed by a vernier delay means 16. Generally, vernier delay means 16 provides a delay which is less than the interval between two adjacent channels. Again, vernier delay 16 may be a suitable delay line, delay multivibrator or phantastron circuit. In the interest of economy, delay means 14 and 16 may be combined into one circuit with two separate controls. The exact amount of delay provided by vernier delay 16 is determined by a signal received from a cross-correlator circuit 18. The output from cross-correlator 18 may be either electrical or mechanical in nature. Assuming an electrical output, an electrical connection from the cross-correlator to the vernier delay is shown in Fig. 1. The total delay provided by delay means 14 and vernier delay means 16 is such that a pulse appears in the output of vernier delay 16 at a time preceding the optimum sampling time of the Nth channel by very nearly the time spacing between adjacent channels.

The output of vernier delay 16, still in the form of a timing pulse, is supplied to a one channel delay means 20. Delay means 20 provides an additional delay equal to approximately the time spacing between adjacent channels in the time multiplexed signal.

The output of vernier delay 16 is also supplied to a gate circuit 22 while the output of delay means 20 is supplied to a second gate circuit 24. Gate circuits 22 and 24 are of the normally blocked type which are unblocked by the signals from vernier delay 16 and delay means 20. The legends gate #1 and gate #2 appearing in Fig. 1 denote the order in time in which these gates are unblocked.

The composite video signal supplied to terminal 10 is supplied to the signal inputs of gates 22 and 24. Gate #1 samples the composite video signal at a time corresponding to channel N–1. Gate #2 samples the composite signal one channel spacing later. This sampling takes place at a rate equal to the recurrence rate of the synchronizing pulses—that is, the composite time multiplex signal is sampled once each cycle for each channel to be dropped out where a cycle is taken as the interval between successive synchronizing pulses.

The regularly occurring pulse-type signals appearing in the output of gate #1 have an amplitude modulation determined by the amplitude modulation of the signals supplied to the channel N–1 at the transmitter. These pulse signals are passed through a low-pass filter 26 to remove the sampling pulse frequency. Filter 26 has an upper cut-off frequency approximately equal to the highest message frequency to be transmitted by the system. The output of filter 26 is supplied to one input of cross-correlator 18. The output of gate circuit #2 is supplied to a similar filter 28. The output of filter 28 is supplied to a second input of cross-correlator 18 and to the output terminal of the system designated by the numeral 30. As mentioned earlier the output signal from cross-correlator 18 is supplied to and controls vernier delay 16.

The operation of the system of Fig. 1 will be explained with reference to Figs. 2A and 2B. Fig. 2A shows the composite video signal with synchronizing pulses 32 which have amplitudes well in excess of the maximum level likely to be attained by the composite video signal. This level is represented in Fig. 2A by the broken line 34. This broken line is also identified in Fig. 2 by the legend "pick off level."

In Fig. 2B the time multiplexed signal for a time interval equal to approximately the three channel spacings N–2, N–1 and N of Fig. 2A has been broken down to show the individual signals making up the composite signal at the receiver during this interval. As shown in Fig. 2B, this interval includes transients 40, 42 and 44 which result from the application at the transmitter of sampled signal pulses to these three channels of the time multiplex system. The period T of these transients is determined by the effective upper cut-off frequency of the circuits at the transmitter and the receiver through which the original pulse signals pass. The periods are substantially the same for all three transients. Each of the transients recurs at regular intervals corresponding to the sampling period at the transmitter, in the example taken above at the rate of 8,000 times per second. The maximum amplitude A of transient 40 will vary on successive occurrences of this transient at a low frequency corresponding to the variation in amplitude of the signal transmitted over channel N. Similarly the amplitudes of transients 44 and 42 are proportional to the amplitude of the signal supplied to channels N–2 and N–1 respectively. The spacing between corresponding points of transients 40 and 42, for example the zero crossing points, is determined by the relative phasing of the sampling pulses at the transmitter for channels N-1 and N. In the preferred embodiment of the invention this spacing is made equal to an odd quarter period of the transient, and preferably to 3T/4. If this is done, the maximum amplitude of transient 40 occurs substantially in time coincidence with the second zero crossing of transient 42.

Turning once again to the system of Fig. 1, delay means 14 is set so that it provides a delay slightly less than the time from the synchronizing pulse to interval $I_1$ of Fig. 2B. It will be assumed for the moment that the delay provided by vernier delay 16 is such that an output pulse provided by this circuit falls within interval $I_1$ of Fig. 2B. Under these conditions the output of gate #1 will be a pulse which has an amplitude equal to the amplitude of the composite multiplexed signal during interval $I_1$; this amplitude will be equal to the sum of the amplitudes of the individual transients.

The one channel delay provided by circuit 20 causes gate #2 to sample the composite signal during the interval $I_2$. Reference to Fig. 2B will show that the amplitude of the output signal of gate #2 is determined primarily by the amplitude of transient 40. Variations in the amplitude of transient 42 will not affect the amplitude of the sample taken during interval $I_2$. Variations in the amplitude of transient 44 will have some effect on the amplitude of a sample taken during interval $I_2$ but the effect will be slight due to the rapid damping of the transient. The portion of the output signal contributed by transient 44 represents distant channel crosstalk. The presence of the crosstalk from distant channels, is an inherent defect of time division multiplex systems having close channel spacing and cannot be avoided merely by controlling the time of occurrence of the sampling pulse. The following description of the invention will show that the embodiment of the invention shown in Fig. 1 selects the proper sampling time mainly with reference to transient 42 and with very little reference to transient 44. This is the optimum condition of operation since crosstalk from channel N–1 can be avoided by properly selecting the sampling time while the very slight crosstalk from channel N-2 cannot be eliminated without reintroducing an even greater amount of crosstalk from channel N—1.

The operation of the cross-correlator 18 and vernier delay 16 may now be explained. Cross-correlator circuits are essentially combined multiplier and averaging circuits. If two entirely unrelated signals (i.e. signals having no common frequencies) are supplied to the inputs of cross-correlator 18, the output therefrom will be zero. However, if even a small fraction of the signal at one input is supplied to the second input along with a large amplitude unrelated signal, the cross-correlator will provide a measurable output since the effect of the unrelated signal is averaged to zero. This output will have a magnitude proportional to the product of the amplitudes of the two related signals and a polarity determined by the relative phases of the related signals. The cross-correlator of the present invention obtains the product for a particular time relationship of the signals. This type of cross-correlator should not be confused with systems of the same name which compare the two signals for all possible time relationships.

Turning again to Fig. 2B it will be seen that, with the two gating or sampling signals positioned as shown, the amplitude at one input of cross-correlator 18 due to transient 42 is relatively large but the amplitude of the input signal from gate #2 due to transient 42 is zero. Therefore transient 42 will produce no signal in the output of cross-correlator 18. Suppose, however, that the time delay of circuit 14 or 16 decreases for some reason. Gate #1 will now derive its output signal from the composite signal during interval $I_1'$ and gate #2 will derive its output signal during interval $I_2'$. The amplitude of the signal at the output of gate #1 due to transient 42 is still fairly large and the corresponding signal in the output of gate #2 is no longer zero. Under these conditions cross-correlator 18 will provide an output signal which is indicative of the amount by which the sampling signal supplied to gate #2 is displaced from the zero crossing of transient 42. In the embodiment shown in Fig. 1 the output signal from cross-correlator 18 is supplied to vernier delay circuit 16 to control (in this example to increase) the delay provided by this circuit. The sense of the deviation varies because of the fact that the transient changes polarity at the zero crossing. If interval $I_2'$ occurs earlier than the zero crossing the output of cross-correlator 18 will have one polarity and will produce an increase in the delay time provided by vernier delay circuit 16. If the interval $I_2$ occurs later than the zero crossing, the output of cross-correlator 18 will have the opposite polarity and a decrease in delay will result. Thus it can be seen that cross-correlator 18 and vernier delay circuit 16 act as a servo system for holding the total delay from terminal 10 to the input of gate #2 at the optimum value.

It will be remembered that the fact that a large amplitude signal derived from transient 40 is supplied to one input of cross-correlator 18 is of no significance since there is no correlation between this signal and the signal resulting from transient 42. The correlation that exists between transients 40 and 42, by virtue of the fact that they recur at the same repetition rate, is eliminated by filters 21 and 28 which cut off well below the repetition frequency.

As mentioned earlier transient 44 will have a slight effect on the output signal but the effect on cross-correlator 18 will be negligible since the signals at both inputs derived from transient 44 are small for small displacements of the sampling gate from its optimum position and one signal is zero when the gates are in their optimum position. Therefore the presence of transient 44 is averaged out by the action of the servo loop, without affecting the final condition.

Figure 3:
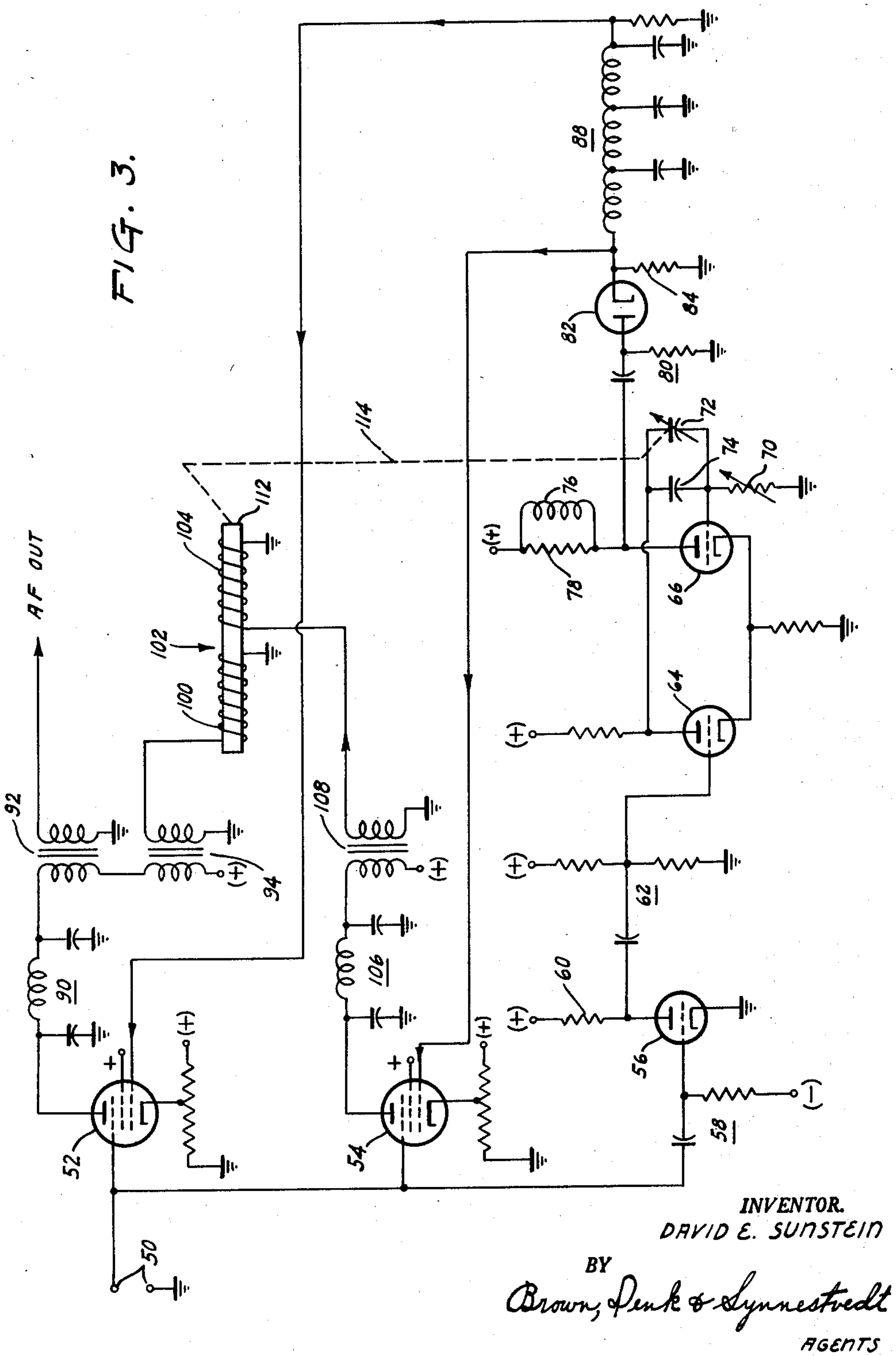
Fig. 3 is a schematic diagram of a circuit organized along the lines of the block diagram of Fig. 1.

Fig. 3 is a schematic diagram of a preferred embodiment of the invention organized along the lines of the block diagram of Fig. 1. The composite time multiplexed signals from the receiver are supplied to input terminals 50 in the upper left corner of the diagram. The signals at terminal 50 are supplied directly to second control grids of two amplifier tubes 52 and 54. The input signal is also supplied to the control grid of an amplifier tube 56 through a resistor-capacitor coupling circuit 58. The lower terminal of the resistor of coupling network 58 is returned to a source of negative potential schematically represented by the minus (—) sign. Amplifier tube 56 is provided with the usual anode load impedance 60. Amplifier tube 56 and the circuit elements associated therewith form the synchronizing pulse separator circuit. Only the high amplitude synchronizing pulses appear at the anode of tube 56, the composite video signal being blocked by the negative bias on the control grid. The anode of tube 56 is coupled through resistor-capacitor circuit 62 to the control grid of tube 64 of a delay multivibrator circuit. The resistor portion of coupling network 62 is connected between ground and a source of positive potential represented by the plus (+) sign in order to establish the proper bias for tube 64. Tube 64, a second tube 66 and the circuit elements associated therewith form a cathode-coupled, unistable multivibrator circuit which provides an output signal that is delayed in time from the time of application of an input signal. The amount of this delay is determined by the constants of the resistor-capacitor circuit associated with the control grid of tube 66 and the anode of tube 64. This resistor-capacitor circuit includes an adjustable resistor 70 which provides a wide range control of the delay. Adjustable capacitor 72, in parallel with a larger fixed capacitor 74, provides a vernier control of the delay. The anode circuit of tube 66 includes a peaking inductor 76 in parallel with the usual load resistor 78. The anode of tube 66 is connected through resistor-capacitor coupling circuit 80 to the anode of a diode clipper 82. The cathode of diode 82 is returned to ground through a load resistor 84.

The signal at the cathode of tube 82 is supplied to the control grid of tube 54 which acts as the #1 gate circuit. Tube 54 and associated circuit elements form a conventional dual grid coincidence circuit.

The cathode of clipper tube 82 is connected to the control grid of tube 52 through a lumped constant delay line 88. Tube 52 and the circuit elements associated therewith form the #2 gate circuit.

The anode circuit of tube 52 includes a low-pass filter 90 and the primaries of two coupling transformers 92 and 94. The secondary of transformer circuit 92 forms the output circuit of the system. The secondary of transformer 94 is connected to one winding 100 of a cross-correlator 102.

The anode circuit of tube 54 is connected to a second winding 104 of cross-correlator 102 through a low-pass filter 106 and coupling transformer 108. The output of cross-correlator 102 is in the form of a mechanical movement of armature 112. A mechanical connection, represented by broken line 114, is provided from armature 112 to capacitor 72.

Fig. 4 illustrates a preferred form of cross-correlator. This cross-correlator comprises an E-shaped core 120 of laminated silicon steel carrying one winding 122 of the cross-correlator on the center arm of the E. The second coil of the cross-correlator is shown in section at 124. Coil 124 is carried on a non-magnetic rectangular support 126. Support 126 is secured to the movable plates 128 of a variable capacitor. Plates 128 are supported by flexible diaphragm 130. Diaphragm 130 is so constructed that the restoring force it exerts on plates 128 when these plates are displaced from their rest position is very small, ideally zero. Diaphragm 130 is supported by and completes the closure of a shallow insulating container 132.

Container 132 is, in turn, supported by brackets 134 and 136 which are fastened at their opposite ends to E-shaped core 120. The whole structure may be supported by securing bracket 136 to a chassis or the like. The stationary capacitor plates 140, which interleave with movable plates 128, are supported by container 132. A small opening 142 is provided in container 132 to permit a controlled amount of fluid to pass into and out of vessel 132. Suitable insulated terminals 144, 146 and 148 for coil 122, coil 124 and capacitor 128—140 completes the structure of Fig. 4.

The operation of the system of Fig. 3 is similar to the operation of the system of Fig. 1. In explaining the operation of the system of Fig. 3 it will be assumed that the cross-correlator of Fig. 4 is employed. Coils 122 and 124 of Fig. 4 correspond to coils 100 and 104 of Fig. 3. Capacitor 128—140 of Fig. 4 corresponds to capacitor 72 of Fig. 3.

The positive synchronizing pulses present in the complex signal supplied to terminals 50 are separated by the amplifier circuit including tube 56. The negative bias, to which the lower terminal of the resistor in coupling network 58 is returned, blocks the message information present in the time multiplexed signal. The negative pulses at the anode of tube 56 drive the grid of normally conducting tube 64 below cut-off. The increase in potential at the anode of tube 64 is applied to the grid of tube 66 by way of capacitors 74 and 72. Tube 66 is normally non-conducting by virtue of the fact that the cathode is held at a positive potential by the common cathode impedance and the grid is returned to ground through resistor 70. The positive signal on the grid of tube 66 causes this tube to conduct heavily and, in so doing, to increase the drop across the common cathode resistor and hold tube 64 cut off. The signal appearing across inductor 76 is a negative peak at the time tube 66 first conducts and a positive peak when tube 66 is cut off. The length of time that tube 66 remains conducting is determined by the RC time constant of the grid circuit.

Resistor 70 is set to give a delay approximately equal to the time to the channel first preceding the one to be dropped out. Capacitor 72 is adjusted by the cross-correlator to provide the exact delay required for minimum crosstalk.

The signal at the anode of tube 66 is passed through clipper tube 82 which removes the negative pulse and leaves only the delayed positive pulse. This delayed positive pulse is supplied directly to the control grid of tube 54. It is also supplied to the control grid of tube 52 through the one-channel delay network 88. As explained in connection with the description of Fig. 1, tubes 52 and 54 sample the complex wave supplied at terminals 50. The output signals of these tubes are pulse signals having amplitudes determined by the amplitudes of the message signals in the complex wave. Filters 90 and 106 block all but the amplitude modulation frequencies present in the pulse signals. If the gate signals are properly positioned in time, the filtered signals resemble the original signals at the transmitter. The filtered signals from the two gate circuits are supplied to the two coils 100 and 104 of the cross-correlator. Any suitable form of cross-correlator may be used in the circuit of Fig. 3 but, as mentioned above, it will be assumed here that cross-correlator 102 is constructed as shown in Fig. 4. One coil of the cross-correlator, coil 100 in Fig. 3 or coil 122 of Fig. 4, sets up a magnetic field around the second coil. Current flowing in the second coil, coil 104 of Fig. 3 or coil 124 of Fig. 4, provides a second magnetic field which reacts with the first magnetic field. The interaction of these magnetic fields sets up forces which tend to separate or attract the coils. In Fig. 4, for example, if the signals supplied to coils 122 and 124 have a component frequency in common, coil 124 will move to the right or left depending upon the relative phases of the component frequency in each coil. If there is no common component frequency in the two coils, the two coils will alternately attract and repel one another. The average net force is zero if there are no common component frequencies. An averaging effect may be introduced by means of viscous or coulomb friction such that many seconds are required for appreciable motion of coil 124 to take place. Coulomb friction may be provided by attaching coil 124 to a highly conductive plate disposed in a strong magnetic field. Fig. 4 illustrates an averaging system employing viscous friction. Container 132 is fluid tight except for the small aperture 142. The maximum rate of movement is limited by the slow flow of fluid into and out of container 132 through aperture 142. In Fig. 4 the fluid employed is air but a suitable liquid may be substituted for air by providing a suitable reservoir communicating with aperture 142.

Turning again to the system of Fig. 3, any error in setting resistor 70 will cause adjacent channel crosstalk signals to appear in the output signals of tubes 52 and 54. These signals will cause coil 124 and attached plates 128 to move in a direction to minimize the crosstalk. Movement of plates 128 changes the capacitance of the delay circuit and moves the sampling time of gate tubes 52 and 54 in a direction to reduce adjacent channel crosstalk. If diaphragm 130 provides no restoring force, coil 124 will move to a position that results in minimum crosstalk and will remain there until the timing circuit at the transmitter or the receiver drifts for some reason. If diaphragm 130 provides a slight restoring force, equilibrium will be reached when the crosstalk still remaining produces a force just balancing the restoring force. The output signal of the system of Fig. 3 is taken from transformer 92.

There are many changes and modifications that may be made in the circuits described above without departing from the spirit of the invention. For example, resistor 70 may be made adjustable in steps and the steps numbered to indicate the channel that will be dropped out for any setting of the resistor. Also, a manually operated vernier control may be provided to insure that the automatically actuated vernier control normally operates near the center of its range of movement. Furthermore, other forms of delay circuits, gate circuits and cross-correlators may be substituted for the circuits and apparatus shown herein.

The circuits herein shown may find application in fields other than time multiplex systems. For example, in color television two signals representing different picture information are combined in a 90° phase relationship. The 90° phase relationship is equivalent to a displacement in time. Separation of these signals at the receiver may be accomplished by sampling the signals at the proper intervals in the manner taught in this specification.

Therefore, while there have been described what are at present believed to be the preferred embodiments of the invention, reference should now be made to the hereinafter appended claims for a definition of the true scope of the invention.

Having now described my invention I claim:

1. A drop-out system for time division multiplex systems comprising first and second normally blocked gate circuits, means for supplying the time multiplexed signal to said two gate circuits, means for generating a signal for unblocking said gate circuits, adjustable signal delay means coupled to said last-mentioned means and to said two gate circuits for supplying said unblocking signals to the latter, said unblocking signal being supplied to one of said gate circuits later in time than to the other of said gate circuits, means responsive to the output signals of said first and second gate circuits and arranged to provide an output signal which is a product function of the output signals of said first and second gate circuits, the zero frequency component, if any, of said product function being indicative of the degree of cross-correlation of said output signals of said first and second gate circuits, and means for supplying at least said zero frequency component of said signal representing said product function to said delay means to control the delay thereof.

2. A drop-out system for time-division multiplex systems employing a multiplexed signal composed of a complex signal representing the several message signals and superimposed synchronizing signals, said drop-out system comprising first and second normally blocked gate circuits, means for separating synchronizing signals from said complex signal, means for supplying said time multiplexed signal to said two gate circuits and said synchronizing signal separating means, adjustable delay means for supplying the output of said synchronizing signal separating means to the control input of said first gate circuit, a second delay means for supplying the output of said first delay means to the control input of said second gate circuit, said second delay means having a time delay substantially equal to the time spacing between adjacent channels in said multiplex system, means for generating a signal indicative of the degree of cross-correlation of two signals supplied thereto, filter means coupling the outputs of said first and second gate circuits to first and second inputs, respectively, of said cross-correlation signal generating means, and means for supplying the output of said cross-correlation signal generating means to said adjustable delay means to control the operation thereof.

3. A drop-out system for time division multiplex systems employing a multiplexed signal composed of a complex signal representing the several message signals and superimposed synchronizing signals, said drop-out system comprising first and second normally blocked gate circuits, each gate circuit being provided with a signal input circuit and a control input circuit, means for separating said synchronizing signals from complex signals, means for supplying said time multiplexed signal to said synchronizing signal separating means and to said signal input circuits of said gate circuits, first delay means for supplying the output of said synchronizing signal separator to the control input circuit of said first gate circuit, first means for controlling the delay of said first delay means over a range greater than the time spacing between adjacent channels in said time multiplexed signal, a second delay means for supplying the output from said first delay means to the control input circuit of said second gate circuit, said second delay means having a time delay equal to the time spacing between adjacent channels in said multiplex system, means for generating a signal indicative of the degree of cross-correlation of two signals supplied thereto, filter means for supplying the outputs of said first and second gate circuits, respectively, to first and second inputs of said cross-correlation signal generating means, and means for supplying the output of said cross-correlation signal generating means to said adjustable delay means thereby to provide a second control of the delay provided by said first delay means.

4. A drop-out system in accordance with claim 3 wherein said cross-correlation signal generating means comprises first and second magnetically coupled coils connected respectively to said first and second inputs, one of said coils being movable with respect to said second coil, and damping means associated with said movable coil for slowing the movement thereof, and wherein said first delay means includes mechanically adjustable control element connected to said movable coil.

5. A drop-out system for time-division multiplex systems employing a multiplexed signal composed of a complex signal representing the several message signals and superimposed synchronizing signals, said drop-out system comprising first and second normally blocked gate circuits, means for separating synchronizing signals from said complex signal, means for supplying said complex signal to said two gate circuits and said synchronizing signal separating means, adjustable delay means for supplying the output of said synchronizing signal separating means to the control inputs of said two gate circuits, the connection from said synchronizing signal separating means to said second gate circuit provided by said delay means having a time delay which is greater than the time delay of the corresponding connection to said first gate circuit by substantially the time spacing between adjacent channels in said multiplex system, means for generating a signal indicative of the degree of cross-correlation of two signals supplied thereto, means coupling the outputs of said first and second gate circuits to first and second inputs respectively of said cross-correlation signal generating means, said coupling means including means for blocking signal components having a frequency equal to the frequency at which said gate circuits are unblocked, and means for supplying the output signal of said cross-correlation signal generating means to said adjustable delay means to control the delay provided thereby.

6. A drop-out system for time division multiplex systems comprising means for sampling the time multiplexed signal during two intervals spaced apart by the normal channel separation of said time multiplex system, means for extracting a synchronizing signal from said time multiplexed signal, a controllable delay means for delaying said extracted synchronizing signal, the output of said delay means being connected to said sampling means to control the operation thereof, the times of occurrence of said sampling intervals being determined by the time of occurrence of said delayed synchronizing signal, cross-correlation means responsive to the sample signals supplied by said sampling means for providing a signal indicative of the degree of cross-correlation of the sample signals taken during said two intervals, and means responsive to the signal provided by said cross-correlation means for controlling the delay of said controllable delay means, said delay controlling means being constructed and arranged to alter the delay of said delay means in a direction to reduce the degree of cross-correlation of said sample signals taken during said two intervals.

7. A drop-out system for time division multiplex systems comprising controllable signal sampling means for sampling the time multiplexed signal during two intervals spaced apart by the normal channel separation time of said multiplex system, means responsive to the output signals of said sampling means for providing a signal representative of the average value of the product function of the output signals of said sampling means derived from said sampling during said two spaced intervals, and means responsive to the output of said last-mentioned means for controlling said signal sampling means to shift the times of sampling of said time multiplexed signal in a direction to reduce the average value of said product function.

8. A drop-out system for time division multiplex systems comprising signal controlled sampling means for periodically sampling the time multiplexed signal during two separate time intervals in each sampling period, said sampling intervals being spaced apart by the normal adjacent channel separation time of said time multiplex system, cross-correlation means responsive to the sample signals supplied by said sampling means for providing a signal which is a product function of the sample signals supplied by said sampling means during said two intervals, the zero frequency component, if any, of said product function being indicative of the degree of cross-correlation of the sample signals taken during said two intervals, and means responsive to said zero frequency component of said signal provided by said cross-correlation means for supplying a signal to said signal controlled sampling means for controlling the time with respect to a selected reference time at which said sampling intervals occur, said last-mentioned signal controlling the time of sampling in a direction to minimize the amplitude of said zero frequency component of said product function.

9. A drop-out system for time division multiplex systems comprising signal controlled sampling means for sampling the time multiplexed signal during two separate time intervals in response to each control signal supplied thereto, said sampling intervals being spaced apart by the normal adjacent channel separation time of said time multiplex system, a source of periodic control signals, signal controlled delay means coupling said source of said control signals to said signal controlled sampling means, cross-correlation means responsive to the sample signals supplied by said sampling means for providing a signal which is a product function of the sample signals supplied by said sampling means during said two intervals, the zero frequency component, if any, of said product function being indicative of the degree of cross-correlation of the sample signals taken during said two intervals, and means responsive to said zero frequency component of said signal provided by said cross-correlation means for supplying a signal to said delay means to control the delay provided thereby, the magnitude of said delay being controlled in a sense to minimize the amplitude of said zero frequency component of said product function.

References Cited in the file of this patent

UNITED STATES PATENTS

| | | |
|---|---|---|
| Re. 22,390 | Lewis | Nov. 9, 1943 |
| 2,416,557 | Wiener | Feb. 25, 1947 |
| 2,501,330 | Hammond | Mar. 21, 1950 |
| 2,556,970 | McFarlane | June 12, 1951 |
| 2,580,421 | Guanella | Jan. 1, 1952 |
| 2,616,976 | Staal | Nov. 4, 1952 |
| 2,628,279 | Roh | Feb. 10, 1953 |
| 2,642,497 | Levy | June 16, 1953 |
| 2,680,153 | Boothroyd et al. | June 1, 1954 |
| 2,689,269 | Bradley | Sept. 14, 1954 |
| 2,794,858 | Houghton | June 4, 1957 |